United States Patent
Coates

[15] 3,653,400
[45] Apr. 4, 1972

[54] SELF-PROPELLED IRRIGATION SPRINKLING SYSTEM

[72] Inventor: Robert N. Coates, 108 Cascade Key, Bellevue, Wash. 98006

[22] Filed: Mar. 7, 1969

[21] Appl. No.: 805,312

[52] U.S. Cl. ................................................137/344, 239/2
[51] Int. Cl. .................................B05b 9/02, E01h 3/02
[58] Field of Search ............................137/344; 239/212, 213

[56] References Cited

UNITED STATES PATENTS

| | | | |
|---|---|---|---|
| 2,800,364 | 7/1957 | Dick et al. | 239/212 X |
| 2,931,579 | 4/1960 | Ruddell | 239/212 X |
| 3,314,608 | 4/1967 | Curtis et al. | 239/213 X |
| 3,335,958 | 8/1967 | Wallace | 239/213 X |
| 3,342,417 | 9/1967 | Dowd | 137/344 X |
| 3,394,729 | 7/1968 | Bower et al. | 239/212 X |
| 3,417,766 | 12/1968 | Purtell | 239/212 X |
| 3,478,773 | 11/1969 | Husky | 137/344 |

*Primary Examiner*—Samuel Scott
*Attorney*—Seed, Berry & Dowrey

[57] ABSTRACT

A self-propelled irrigation apparatus wherein a rigid water-distributor pipe is revolved about one of its ends as a pivot which also provides a connection to the water source, the distributor pipe being conveyed over the ground to be sprayed by individual electric motor-powered mobile supports. The pipe sections between mobile supports are strengthened by trussing with cables located beneath the level of the pipe and the individual motors driving the multiple support assemblies are controlled in response to horizontal flexing of the distributor pipe due to lagging or advancing of any one of the support assemblies relative to the others. Each support assembly constitutes a rigid A-frame structure with two pivotally-mounted and independently driven ground-wheel units located on opposite sides of the distributor pipe. The drive means for the support assemblies are sychronized so as to drive the respective support assemblies at the proper speed to make one revolution of the distributor pipe in a given time interval.

3 Claims, 9 Drawing Figures

Patented April 4, 1972 3,653,400

ROBERT N. COATES
INVENTOR.

BY
ATTORNEYS

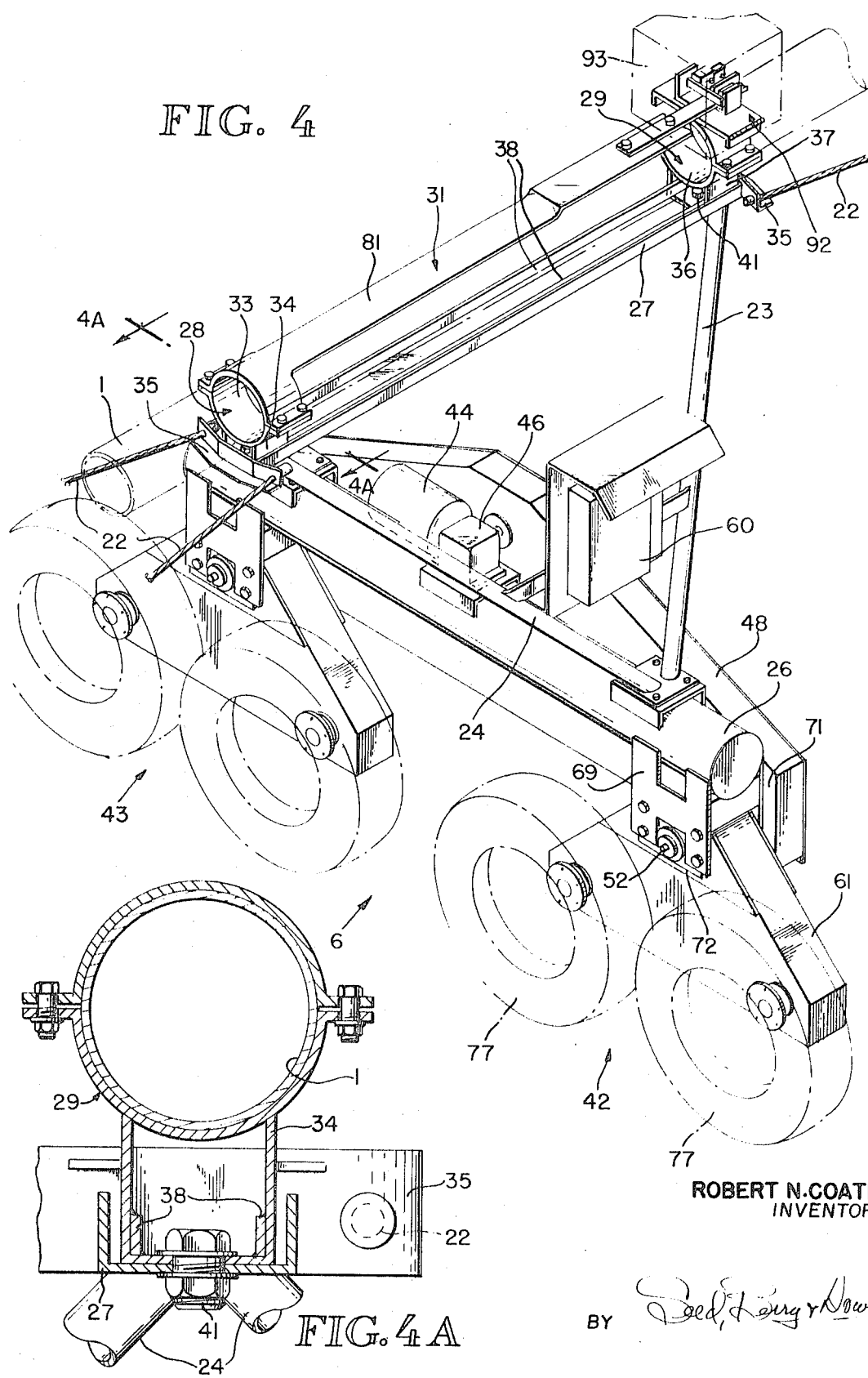

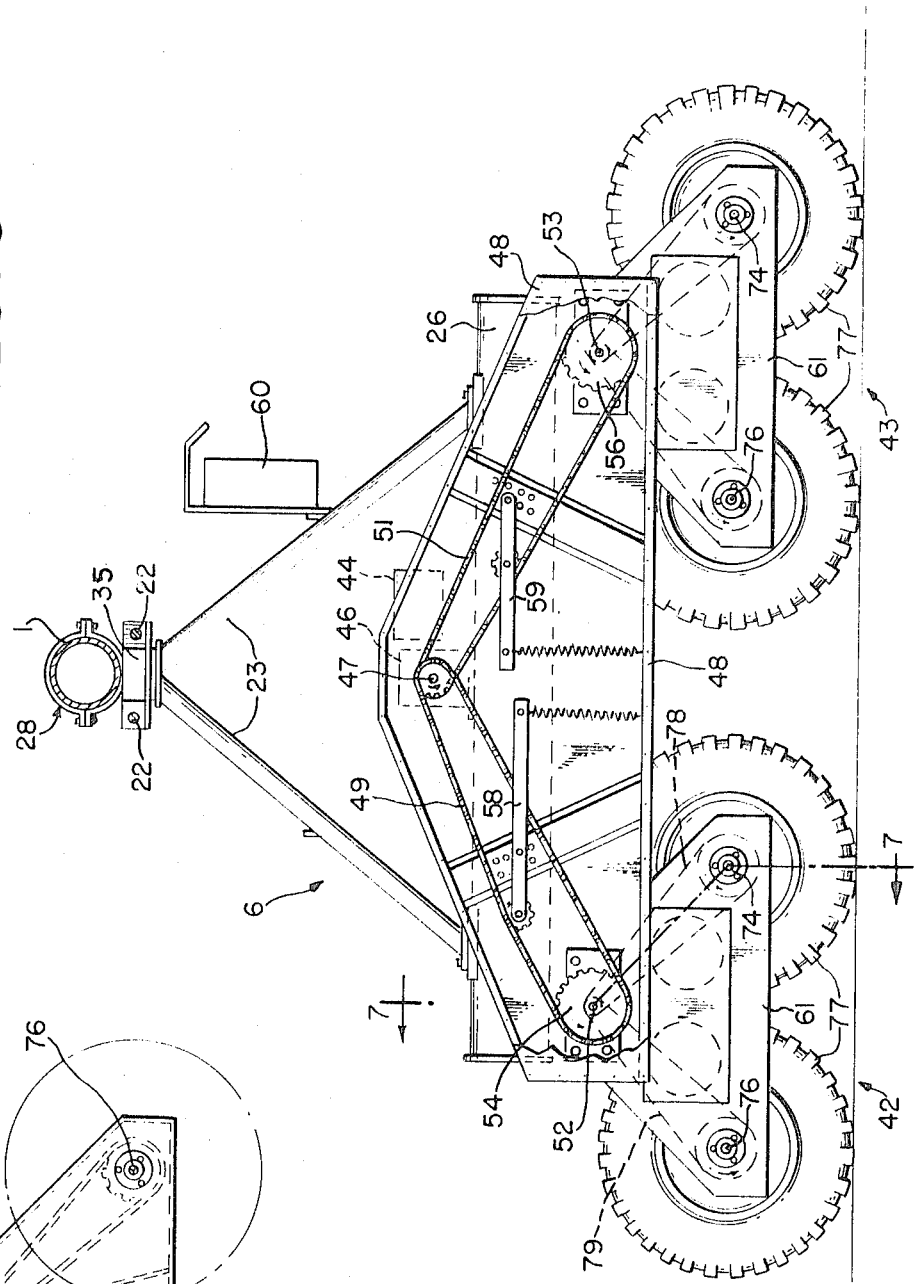
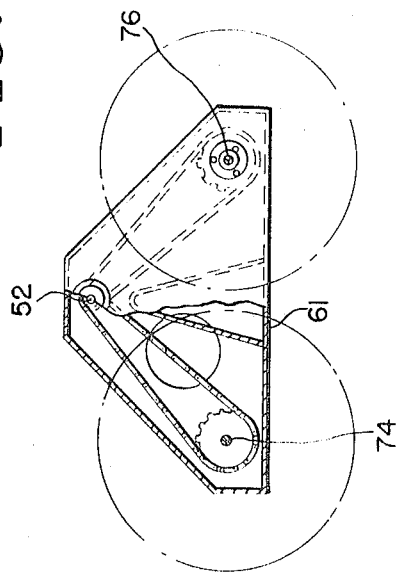

ROBERT N. COATES
INVENTOR

BY Seed, Berry & Dowrey

ATTORNEYS

3,653,400

SELF-PROPELLED IRRIGATION SPRINKLING SYSTEM

BACKGROUND OF THE INVENTION

The present invention relates to self-propelled irrigation sprinkling systems generally, and more particularly to such a system wherein the water-distributor pipe is rigid throughout its length and is supported by spaced mobile support assemblies with each assembly being powered by its own electric motor. The drive means for each assembly is arranged so that each assembly travels at the proper speed to make one complete revolution of the distributor pipe in a given time interval with additional control of the motor units to maintain the pipe in alignment being accomplished responsive to the flexing or bending of the distributor pipe in a horizontal plane. The common practice in the prior art has been to form the pipe in sections so as to allow pivoting or free bending at the joints and the function of sensing and controlling the travel of the mobile support assemblies has been accomplished in various ways. One such control system involves mounting the distributor pipe in pendulum fashion so that its displacement in a horizontal plane will actuate control switches. Other known systems utilize the movement of supporting cables or other longitudinally extending members to actuate control switches or valves to actuate the motor means. Generally speaking, these systems tend to complicate, in one way or another, the already massive and cumbersome structure of the apparatus. A related problem is that of accomplishing even and uniform travel of each spaced mobile support assembly when traversing rutted, furrowed or otherwise uneven terrain. The tendency under such conditions is to lose traction at one or more of the spaced mobile support assemblies, thereby causing a misalignment in the distributor pipe and, at the same time, losing the ability to make a correction, regardless of what sensing and control system is used. The present invention seeks to improve the sensing of misalignment in the distributor pipe by a simplified and rugged deflection sensor which detects the deflection in a rigid distributor pipe and at the same time to provide an improved mobile support assembly with synchronized drive means which renders it virtually impossible to lose traction under the most severe conditions.

The present invention also provides an improved structural arrangement for supporting the distributor pipe between mobile support assemblies by eliminating the need for any overhead tower or cable system above the distributor pipe. Likewise, an improved arrangement is provided for the electrical connector which permits the electrical lead wires, which must travel with the distributor pipe, to also pivot about the pivotal axis of the pipe.

An object of the present invention is therefore to provide a simplified, yet highly sensitive and rugged, deflection sensing device for the water-distributor pipe and to provide a mobile support assembly which insures constant traction over rough and uneven terrain.

Another object of the present invention is to provide an independently powered mobile support assembly having independently driven pivotally mounted ground-wheel units located on opposite sides of the longitudinal axis of the distributor and wherein the drive means for the plurality of support assemblies is synchronized so as to produce a complete revolution of the distributor pipe in a given time interval.

Another object of the present invention is to provide a self-propelled irrigation sprinkler device wherein all overhead support structure for the distributor pipe is eliminated and to provide an improved electrical connector device which permits electrical lead wires to be carried with the water-distributor pipe as it revolves about one of its ends.

Other objects and advantages of the present invention will be apparent to those skilled in the art from the following specification and appended claims and from the accompanying drawings.

DESCRIPTION OF THE DRAWINGS

FIG. 4 is a perspective view of one of the mobile support assemblies;

FIG. 4A is a cross-sectional view taken along lines 4A—4A of FIG. 4 illustrating the connection between the mobile support assembly and the distributor pipe;

FIG. 5 is a side-elevational view showing the drive arrangement for the mobile support assembly;

FIG. 6 is a partially sectioned detail of the final drive for the ground-supporting wheels of the mobile support assembly;

DESCRIPTION OF THE INVENTION

Figure 1:
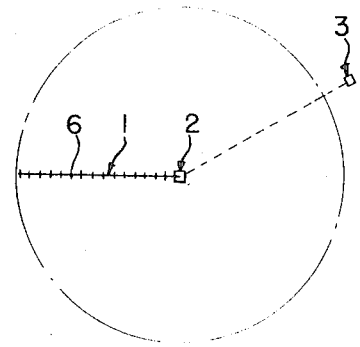
FIG. 1 is a diagrammatic plan view showing a typical installation of the sprinkling system of the present invention and the character of the area irrigated.

Referring now to the drawings wherein like reference numerals indicate identical parts in the various views, FIG. 1 illustrates the positioning of the self-propelled sprinkler system wherein the water-distributor pipe 1 is revolved about one end which is connected to a hub or pivot structure indicated generally at 2. The water source is connected to the pivot structure 2 with both electrical and water conduits (represented by the dashed line in FIG. 1) extending from the pivot structure 2 to a suitable control panel 3 which may be located in a shelter if desired. As the water-distributor pipe 1 revolves around the pivot 2, a circular area is irrigated by means of conventional spray nozzles 4 spaced along the length of the distributor pipe. The water-distributor 1 is a continuous rigid pipe which may be 6 inches or more in diameter and is carried approximately 6 feet above the ground, although this may vary. The mobile support assemblies indicated generally at 6 in FIG. 1 may be placed approximately 90 feet apart and as many as 15 such units have been used although the system is not limited to any particular number of mobile supports.

Figure 2:
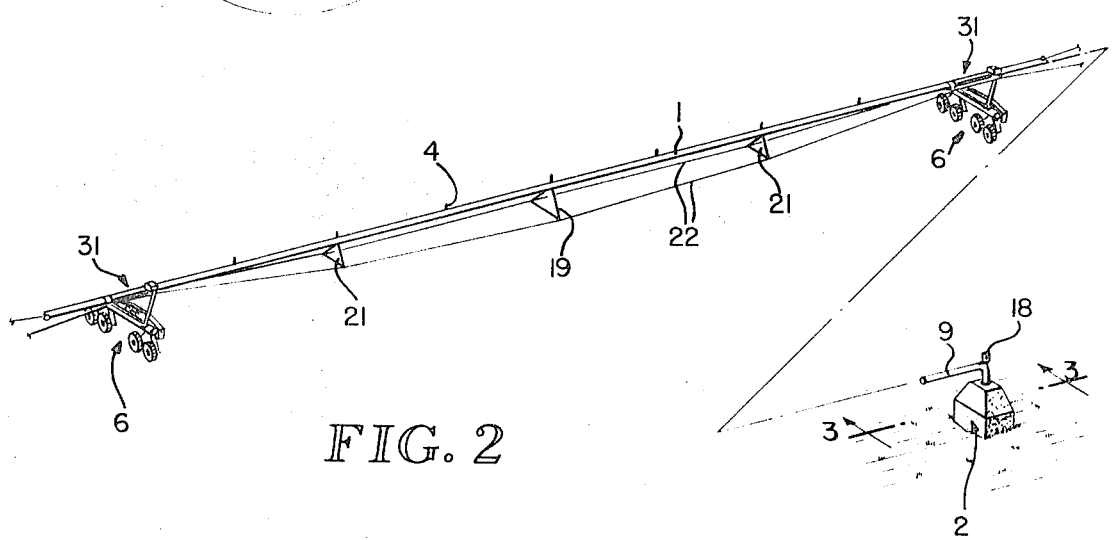
FIG. 2 is a perspective view showing a portion of the distributor pipe between two mobile support assemblies.
Figure 3:
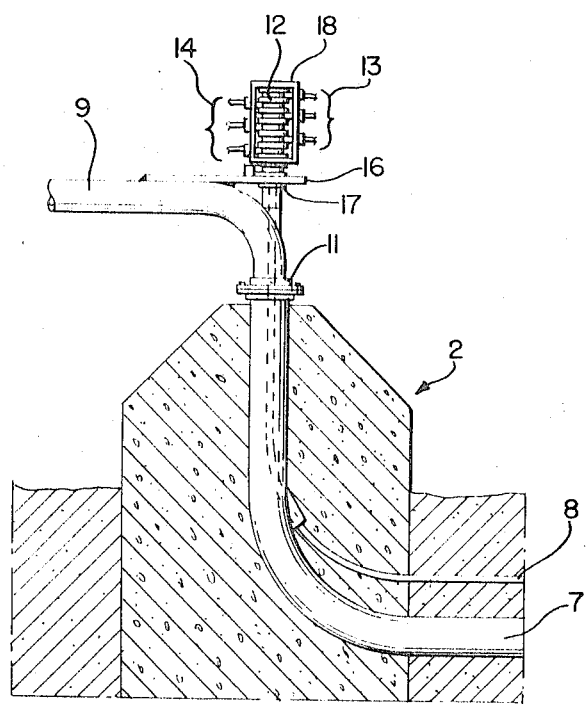
FIG. 3 is a partially sectioned view taken along lines 3—3 of FIG. 2 and illustrating the pivotal connection of the water-distributor pipe and the electrical lead wires.

Referring to FIGS. 2 and 3, the pivot structure 2 may comprise a concrete hub which mounts a water-pressure conduit 7, connected to a suitable source of water pressure, and the electrical conduit 8, both of which may extend to a control panel 3 previously mentioned. The end portion of the water-distributor pipe 1 is connected to the pipe 7 by means of a bearing and packing gland 11 which permits the distributor pipe 1 to revolve about the central axis of the vertical portion of the supply pipe 7. In order to provide a connection between the electrical lead wires extending along the distributor pipe 1 for control of the mobile support assemblies, a stationary collector ring 12 is connected to the end of the conduit 8. The collector 12 is provided with a first set of three brushes 13 and a second set of three brushes 14 with the three brushes 14 being connected to lead wires for three-phase motors carried by each mobile support assembly and the three brushes 13 being connected to the control panel 3 via the conduit 8. The conduit 8, it will be noted, is passed into the interior portion of the pipe 7 and extends along the longitudinal axis of the vertical section of the pipe, through the bearing 11 and emerges from the vertical end portion of the water-distributor pipe along its central axis. A bracket member 16 fixed to the end portion 9 of the conduit carries a thrust-bearing 17 which allows the water-distributor pipe to revolve about the axis of the vertical end section of the pipe 7 and the electrical conduit. The carrier frame 18 for the brushes 13 and 14 will, of course, rotate with the distributor pipe 1.

As aforementioned, the mobile support assemblies 6 are placed approximately 90 feet apart along the length of the distributor pipe. To provide support for the pipe sections between the mobile supports, the pipe is trussed from beneath by cable means. A triangular frame 19 is located at the midpoint between the support assemblies and an additional triangular frame 21 located on each side of the center-frame 19. Frames 19 and 21 may be unilateral triangles with the frames 21 being of identical dimensions and the center-frame 19 being somewhat larger. In practice, the center triangular frame 19 may have approximately 42 inch sides and the frames 21 may have approximately 30 inch sides. A trussing cable 22 runs along each side of the distributor pipe and is attached by any suitable means, such as a conventional cable clamp (not shown), to the triangular frames, thereby placing the cables 22 in tension and rigidifying the distributor pipe. This arrangement eliminates all overhead towers or cable supports for the distributor pipe 1 commonly used in the prior art.

Referring to FIGS. 4 and 5, each mobile support assembly is mounted in fixed position on the distributor pipe 1 and includes a double A-frame arrangement having first and second sets of tubular struts 23 and 24, respectively, which connect the tubular frame member 26 to a channel member 27 which is, in turn, mounted to the distributor pipe 1 as will presently be described. The tubular frame member 26 extends at right angles to the distributor pipe and the channel member 27 extends parallel thereto. The struts 23 and 24 may be welded to connector plates or the like carried on the frame 26 and may be welded or otherwise rigidly connected to the channel 27 to provide a rigid frame structure. The channel 27 is adapted to receive longitudinally spaced pipe clamps 28 and 29, respectively, which are connected to the channel 27 in a manner presently to be described and cooperate with mating structures which form a part of the pipe deflection sensor indicated generally at 31.

The pipe clamp 28 includes a semi-circular portion 33 which engages the distributor pipe 1 and is connected by welding or the like to the U-shaped base member 34. A cable-anchoring bracket 35 is welded to the member 34 with the cables 22 being anchored to its opposite ends. The base member 34 sets into the channel member 27 and, as illustrated in FIG. 4A, sufficient clearance is provided between the sides of the channel 27 and the base to allow a certain amount of turning of the base for a purpose to be described. Likewise, the clamp member 29 has a semi-circular portion 36 welded to the U-shaped base member 37 which sets in the opposite end of the channel member 27. The two U-shaped base members 34 and 37 are connected by the spanner members 38 which serve to transmit the tension forces on the cables 22. As illustrated in FIG. 4A, the U-shaped base 34, and likewise the base member 37, are connected to the channel 27 by means of a single bolt 41 which allows the members to pivot relative to the channel when the pipe 1 is deflected in the area of the support assembly. This deflection or bending is then sensed to provide a control signal for the related motorized wheel assembly.

Figure 7:
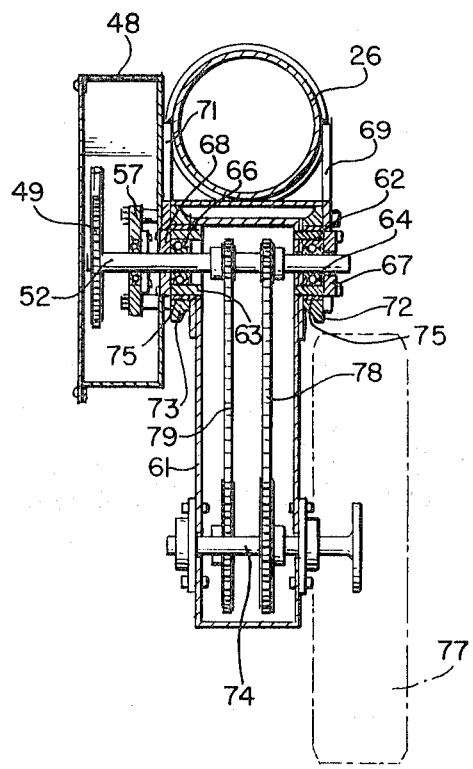
FIG. 7 is a cross-sectional view taken along lines 7—7 of FIG. 6.

Each end of the tubular frame 26 is pivotally connected to independently driven ground-wheel units, indicated generally at 42 and 43. Since the ground-wheel units 42 and 43 are substantially identical in all respects, only one such assembly will be described in detail. FIGS. 4 and 5 illustrate the manner wherein the ground-wheel units 42 and 43 are driven by a common drive which includes the motor 44, the gear reduction 46 and an output drive shaft 47 which extends into the sealed stationary drive transfer housing 48 carried by the tubular frame member 26. As seen most clearly in FIG. 5, power from the output shaft 47 is transfered forwardly and rearwardly by the chains 49 and 51, respectively, so as to drive the output stub shafts 52 and 53, respectively, through the sprockets 54 and 56. As shown in FIG. 7, the stub shaft 52 is journaled for rotation by the bearing mount 57, carried in the housing 48, and extends into the pivoted ground-wheel unit. The stub shaft 53 is mounted in identical fashion. Spring-biased chain tighteners 58 and 59 are pivotally mounted within the housing 48 and are provided with idler sprockets so as to maintain the chains 49 and 51, respectively, in a tightened condition. The transfer housing 48 may be sealed so as to keep the chain drive members free from sand and dirt. As a manner of convenience, the electrical components involved in the control circuitry for the motor 44 may be contained in a circuit box 60 mounted between the struts 23 and 24.

Each ground-wheel unit includes a generally triangular chain housing 61 which may be made from sheet metal and which is fitted with aligned bosses or hubs 62 and 63, as illustrated most clearly in FIG. 7, which serve to mount the stub axle bearing units 64 and 66 for receiving the stub shaft 52. In order to pivotally mount the chain housing 61 on the tubular frame 26, a hanger frame which includes the vertical plates 69 and 71 is welded to the tubular member 26. The plates 69 and 71 are provided with heavy-gauge journals 72 and 73 for receiving the bosses 62 and 63 of the chain housing 61 which rotate therein. Bronze bushings or the equivalent 75 are located between the journals 72 and 73 and the bosses 62 and 63. On each end of the bottom portion of the chain housing 61, axle shafts 74 and 76 are mounted for the attachment of ground wheels 77, the ground wheels being driven by means of the chains 78 and 79 trained about drive sprockets on the stub shaft 52 and the axle shafts 74 and 76, respectively.

Figure 8:
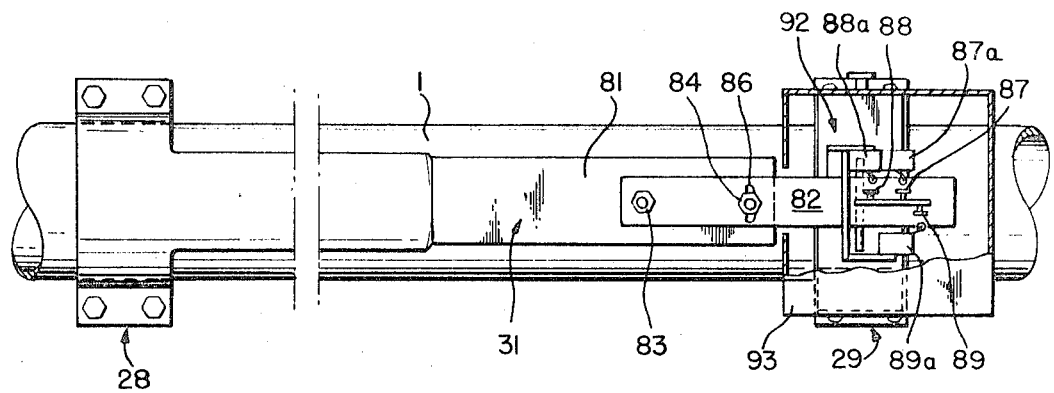
FIG. 8 is a plan view of the deflection sensor mounted on the water-distributor pipe.

Referring now to FIGS. 4 and 8, the deflection sensor 31 includes an elongated arm 81 which has one end fixed to the pipe clamp 28 and extends longitudinally along the axis of the distributor pipe 1. The opposite end of the member 81 is provided with an adjustable switch operator arm 82 connected thereto by a first bolt 83 and a second bolt 84 with the slot 86 permitting the contact member 82 to be adjusted relative to the member 81 about the bolt 83. This adjustment provides a means for adjusting the sensitivity of the deflection sensor. The opposite end of the contact arm 82 is provided with three switch contact members 87, 88 and 89, arranged in offset manner as illustrated most clearly in FIG. 8. A switch-mounting bracket indicated generally at 92 is clamped to the pipe clamp 29 and mounts three contact members 87–89. With this arrangement, it will be seen that the switches remain in fixed position on the distributor pipe 1 as it flexes and the arm 82 of the sensor 81 with the switch contact members is free to move relative to the switches as the pipe bends. A protective cover 93 may be hinged to the switch-mounting bracket 92 to protect the switches from the elements.

The switching arrangement shown in FIG. 8 is that preferable for intermediate support assemblies. With this three-switch arrangement, the contact member 87 operates the main control switch 87a for the electric motor 44 under normal conditions. The switch may be a conventional single-pole switch for interrupting the circuit to the motor in the event the related support assembly leads the adjacent support assemblies so as to cause a deflection in the pipe 1. The remaining two contacts, 88 and 89, control limit switches 88a and 89a, respectively, which provide a safety factor in the event of the failure of the primary control switch or a failure of the motor 44. In the event the switch 87a fails to operate, and the motor continues to drive the support assembly ahead of the other assemblies, further bending the pipe, the second contact member 88 will operate to open the limit switch 88a, breaking the motor circuit. In the event the motor fails to operate for any reason, causing the associated support assembly to lag the other assemblies so as to bend the pipe 1, the contact 89 will operate the switch 89a to halt the entire system by breaking the circuit to all motors.

The support assembly adjacent the assembly on the outer end of the distributor pipe will be provided with a double set of control switches, i.e., six switches and contact members for additionally controlling the outer support assembly. This is necessary, of course, since there is no opportunity to sense deflection on the outer assembly should it lag or advance the adjacent assembly.

In operation, water pressure is supplied through the conduit 7 under the control of a main water valve. As mentioned, the drive means for each of the mobile support assemblies is geared so that all of the assemblies will make a complete revolution of the distributor at its particular radial distance from the hub 2 in the same given time interval. This means, of course, that the support assemblies on the outer end of the pipe 1 must travel at a greater speed than those adjacent the hub 2 since they travel a greater distance during the same time interval. If desired, this time interval may be controlled by a timer device in the panel 3 so as to halt operation of the device after one complete revolution. This time period may be varied by well-known electrical timing devices which will interrupt the circuit at regular intervals so as to increase the total time required for a complete revolution of the pipe. The individual support assemblies are controlled for speed of travel by selecting the proper ratio between the sprockets 54 and 56 and the main drive sprocket on the output shaft 47 as seen in FIG. 5. It is also possible to vary the size and rating of the electrical motors of the various support assemblies so as to obtain the proper drive ratio combination. When the device is set in motion, the motors 44 of the support assemblies operate constantly to carry the distributor pipe steadily through its revolution. This would be the case if the area to be irrigated were perfectly flat and smooth, which is seldom, if ever, the case. For this reason, it is necessary throughout the revolution of the distributor pipe to provide an on-off control for each support assembly to adjust for the lagging or advancing of the particular assembly due to rough ground and up and downhill grades. In the event that any particular support assembly lags or leads its adjacent assemblies, the pipe 1 will flex or bend causing the contact members on the arm 82 to contact associated control switches in the manner previously described. It will be noted that the flexing of the pipe 1 results in actually pivoting the U-shaped base members 34 and 37 relative to the channel 27 since these members are fixed to the flexing pipe. The arm 81, however, remains rigid, providing the differential movement between the switches and switch operators. It will also be noted that when traversing pronounced undulations in the ground surface, the support assemblies will be allowed to rock about the longitudinal axis of the pipe 1 in order to relieve any undue torsional stress on the pipe 1. This may be accomplished by allowing a certain amount of slippage between the clamps 28 and 29 and the pipe 1. It has been found that allowing for this small amount of slippage does not affect the stationary positioning of the support assemblies along the length of the pipe. With this arrangement and the pivotal mounting of the independently driven ground-wheel units 42 relative to the frame 26, there is no opportunity for loss of traction under all normal conditions.

From the foregoing, it will be apparent to those skilled in the art that the present invention offers significant improvements in self-propelled irrigation sprinkling systems of the character described. Changes in the details of construction may be resorted to without departing from the spirit of the invention and it is accordingly my intention that no limitations be implied and that the hereto annexed claims be given the broadest interpretations to which the employed language fairly admits.

The embodiments of the invention in which an exclusive property or privilege is claimed are defined as follows:

1. In a self-propelled irrigation device having a continuous rigid water-distributor pipe carried by a plurality of spaced mobile support assemblies, deflection sensor means for detecting bending of said pipe at the support assemblies to control the operation of the assemblies comprising; a rigid frame member fixed to the support assembly and located beneath the pipe extending parallel therewith, a sensor arm, first clamping means clamping one end of the arm to the pipe and in pivotal relation to said frame member, the other end of said sensor arm being free, second clamping means for mounting control switches to the pipe and in pivotal relation to said support structure adjacent the free end of the sensor arm, and contact members on the free end of said sensor arm for contacting selected ones of said switches upon deflection of the pipe between the clamping means.

2. A mobile support assembly for carrying a movable water-distributor pipe comprising; a rigid frame structure adapted for connection to a distributor pipe and including a frame member extending at right angles to the distributor pipe, a source of motive power on said frame structure, first and second ground-wheel units pivotally mounted for swing movement relative to the frame member on the opposite end portions of said frame member, each ground-wheel unit including a wheel frame having two spaced ground-wheels journal for rotation thereon, said wheel frame being pivotally mounted on the frame member for swing movement relative to said frame member, a stub shaft on said wheel frame extending coaxial with the pivotal connection of the wheel frame, drive transfer means independently drivingly connecting the ground-wheel of each of said ground-wheel units to said power source, said drive transfer means including a first drive connection between the motive power source and said stub axle and second and third drive connections between the stub axle and said ground-wheels.

3. The support assembly according to claim 2 wherein, said motive power source comprises an electric motor and said first, second and third drive connections comprise chain and sprocket drives, said wheel frame comprising a generally triangular hollow housing mounting said second and third drive connections, and means to seal said housing to retain a quantity of lubricating material therein.

* * * * *